Dec. 6, 1966  R. H. McHOWELL  3,290,585
MAGNETIC FLOW METER SYSTEM WITH OVERRIDE CONTROL
Filed Aug. 6, 1962
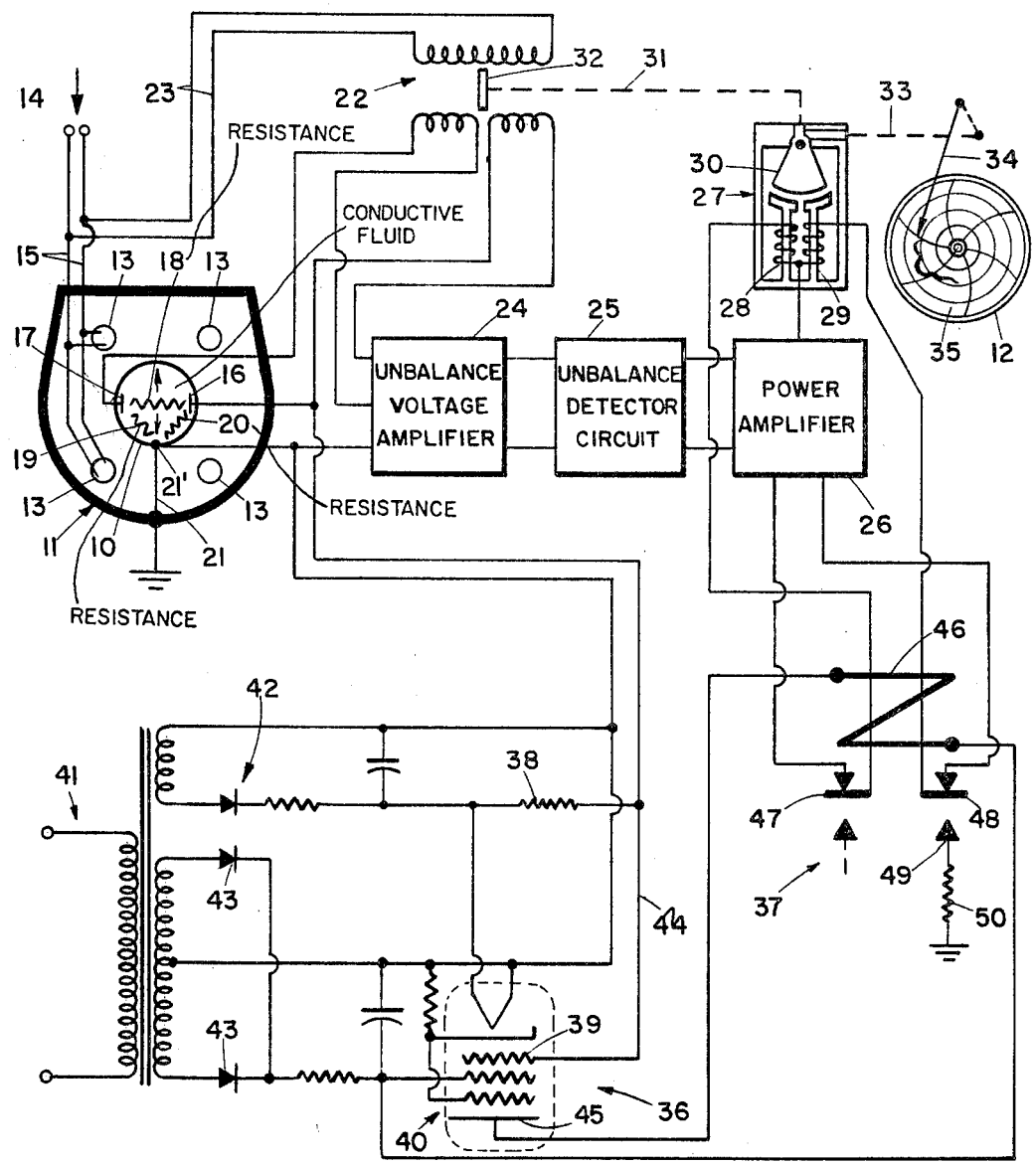
FIG. II
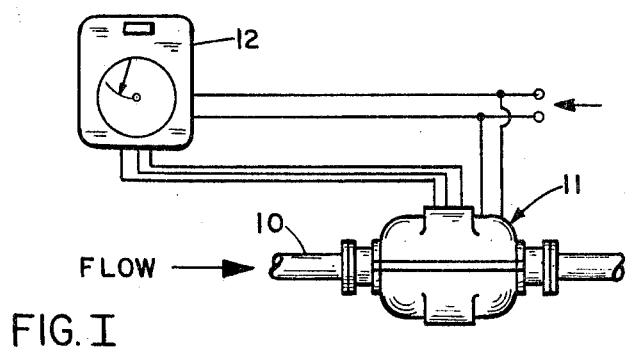
FIG. I
*INVENTOR.*
ROBERT H. McHOWELL
BY
Lawrence H. Dalton
AGENT

United States Patent Office 3,290,585
Patented Dec. 6, 1966

3,290,585
MAGNETIC FLOW METER SYSTEM WITH OVERRIDE CONTROL
Robert H. McHowell, Foxboro, Mass., assignor to The Foxboro Company, Foxboro, Mass., a corporation of Massachusetts
Filed Aug. 6, 1962, Ser. No. 214,892
1 Claim. (Cl. 324—34)

This invention relates to industrial instrumentation for the measurement of flow of fluids, with particular reference to flow measurement of conductive fluids.

A particular form of this invention is an improvement in magnetic flow meters.

Magnetic flow meters deal with conductive fluids, utilizing electrical circuits with the fluid itself a part of the circuit.

Conductivity changes of the fluid over a wide range do not affect the flow measurement of a good magnetic flow meter since voltage is measured without appreciable current drain, and the voltage varies directly with variations in the velocity of the flowing conductive fluid.

A difficulty occurs when the conductivity parameter of the fluid is changed extraordinarily. The liquid may be absent, and thus not included in the measuring circuit. Electrodes may acquire high impedance films, and effectively cut the fluid out of the circuit. Also, if the fluid is essentially nonconductive or by some other means the fluid conductivity parameter may be substantially decreased or replaced by some other high impedance.

In each of the above instances, the system essentially floats above ground and irregular and/or erroneous measurement signals may result from extraneous voltages thus made effective.

These errors and irregularities can be misleading and costly, for example, in flow situations which involve measurements provided as a basis of costs.

This invention provides means for obviating this difficulty in that when the fluid conductivity parameter is changed as described, an override control sypstem is automatically brought into play to set and maintain the measurement record or indication to and at a predetermined value, for example, zero.

In like manner, this invention may provide such control means to actuate an alarm, or to actuate means for indicating, recording or controlling with respect to any suitable associated function device.

The control of this invention may be made to cut in at a predetermined point with respect to the wide conductivity range of a good magnetic flow meter, preferably near the response curve break point as conductivity is extraordinarily reduced, that is, near an end of the wide conductivity range band.

The basis of this invention is an electrical circuit in which a D.C. control system is incorporated into the standard A.C. measurement system. The measurement system is a high impedance input A.C. system that is not affected by the D.C. voltages impressed.

When the fluid conductivity parameter is so undesirably changed as described, the control system is electrically changed to activate or deactivate the overriding control.

The control system is essentially a voltage divider circuit of two resistances in series, with one of the resistances provided by the conductive measured fluid. When this one of the resistances is altered to or supplanted with a high impedance, the voltage divider change is applied to a gating unit which in turn activates or deactivates whatever device is desired, for example, it may reduce and maintain the measurement record or indication to and at zero.

It is, therefore, an object of this invention to provide a new and useful flow meter system.

Other objects and advantages of this invention will be in part apparent and in part pointed out hereinafter, and in the accompanying drawings, in which:

FIGUREd I is a schematic illustration of a magnetic flow meter according to this invention; and FIGURE II is a schematic and circuit diagram of the flow meter system according to this invention.

The magnetic flow meter operates on the principle of a power generator. When a moving conductor cuts across lines of force in a magnetic field, a voltage is induced in the conductor. If the dimensions of the conductor and the magnetic field strength remain constant, then the induced voltage is directly proportional to the velocity of the conductor.

Thus, in the magnetic flow meter, the process fluid is flowed through a tube, and the process fluid is itself the moving conductor. Its size is constant, being determined by the inside diameter of the tube. A constant uniform magnetic field is generated by an electromagnet encircling the tube.

Since the output is a function of flow velocity, the output can in no way be influenced by such factors as temperature, viscosity, turbulence, or conductivity, as long as the fluid is sufficiently present in the tube to form a part of the measurement circuit, as long as the fluid is conductive, as long as high impedance filming of the inner wall of the tube does not essentially cut off the fluid from the measurement circuit, and as long as no other high impedance is substituted for the ordinary fluid impedance in the measurement circuit. The output is linear and is detected by the use of electrodes flush mounted oppositely on the inner wall of the tube, as a part of the measurement circuit.

The FIGURE I illustration shows a flow tube 10 extending through an electromagnetic flow meter housing 11, with a recorder unit 12 connected to the output of the housing unit 11. Like reference numbers indicate these elements in the overall circuit showing of FIGURE II.

In the overall showing of FIGURE II, a magnetic flow meter system is shown schematically and generally at the top of FIGURE II. At the left of this top portion of FIGURE II there is shown the magnetic flow meter housing 11 containing an endwise view of the flow tube 10 centrally located therein and perpendicular to the drawing. The magnetic field for this magnetic flow meter that is to create the field within the tube is generated by coils encircling the tube and represented in FIGURE II within the flow meter housing 11 by coil sections 13. Coil sections illustrated at 13 produce a uniform magnetic field within the flow tube by means of two saddle-shaped coils of insulated wire. These coils are wound in the usual magnetic flow meter fashion and are power supplied from a source 14 to connectors 15.

Within the flow tube 10 in the usual magnetic flow meter manner, electrodes 16 and 17 are provided. These electrodes are for clarity shown separated from the tube wall but in fact of actual construction are imbedded in the tube wall and flush with the inner surface thereof so there will be no obstruction to fluid materials flowing through the tube. In the FIGURE II showing of the flow tube 10 for the purpose of this invention, representations of resistances are shown as at 18 between the electrodes 16 and 17 and as at 19 and 20 indicating resistances between the electrode 17 and ground at 21 and electrode 16 and ground at 21. These resistances are provided by the conductive fluid in the flow tube 10. Thus, ordinarily, a resistance pattern is provided within the flow tube 10 as between the contacts and between each contact and ground and this resistance pattern is a part of the overall electrical situation of the total circuitry.

The output from the flow tube 10 electrodes 16 and 17 is take through a differential transformer 22 which is also powered from the input 14 through leads 23, into an unbalance voltage amplifier 24. The amplifier 24 is followed by an unbalance detector circuit 25 and further followed by a power amplifier 26. The output of the power amplifier is to an electro-mechanical transducer 27. In this instance, the transducer takes the form of a pair of solenoid coils 28 and 29 for the operation of a pivoted member 30 for movement according to the magnitude and phase of the unbalance signal from the flow meter measurement. That is to say, the coil 28 for example, might be the upscale actuator and 29 may be the downscale actuator according to the phase of the system. Thus, if the measurement signal indicated a movement of signal value upward, then the coil 28 would be operatively energized and if it were to be downward, the coil 29 would be so energized.

In either case, a mechanical connection 31 is provided to a movable ring 32 in the differential transformer 22 to rebalance the system in the usual standard practice in devices of this nature. At the same time pivotal movement of the mechanical member 30 through a mechanical connection 33 will actuate a pen 34 with respect to a chart 35 in the recording instrument 12.

Thus, in the normal operation of this device a measurement of the flow of the fluid would be made and the system responds to it by recording on the chart and rebalancing in the central transformer 22.

However, problems can and do occur with respect to the fluid in the flow tube 10. There often are times when there is no fluid in the tube or during a shutdown or readjustment or for some other reason the flow is stopped and the fluid drained out of the tube. Thus when the tube 10 is empty of the fluid to be measured, the resistances 18, 19, 20 are absent and the overall circuitry is disturbed electrically and it may be harmful in a sense of misdirection and misreading and errors in markings on the chart since these resistances are relied on to stabilize the operating circuit within a certain range of operaion.

Another form of disturbance may be when a film from the liquid or otherwise collects on the interior of the tube 10 and may cover the contacts 16 and 17 of the ground contact illustrated here as at 21′ in the tube itself, or the adjacent piping to which the tube is connected.

In the event of such filming, high impedances are established between the fluid being measured and the contacts 16 and 17 or the ground contact 21, any or all of these. In such a case, the resistances 18, 19, 20 although present are increased unusually. It is as if the wires had been cut and high impedances inserted. Whatever situation substitutes such inordinate high impedance would have the effect of throwing the whole system off and quite likely providing errors and inaccuracies in the readings of the overall system.

This invention provides a new overall magnetic flow meter circuit. This circuit provides means to respond when the resistances 18, 19 and 20 of the flow tube are no longer effective. This response is action, according to a predetermined plan, to avoid errors and inaccuracies which occur if such action is not taken.

This predetermined action may be the actuation of an alarm or the operation of some device to clean out the film from the tube if that is the problem, or to shut off the hydraulic flow system if the flow material is nonconductive if that is the problem, or any one of many possible suitable actions which could be taken in order to take care of the fact that the system is no longer operating properly.

An illustration is given here of one such action. It provides energization for one of the solenoid coils 28, 29 normally the downscale coil when these undesirable actions occur in the flow tube 10. The downscale coil with the solenoid 27 is then actuated and the recording instrument is set at zero until corrective changes are made. This may be a false zero as desired or the movement may be upscale to maximum instead, but as an illustrative example, a corrective action is a matter of reducing the recorded measurement to zero when these untoward acts occur with respect to the fluid flow tube 10 and the resistances 18, 19, 20, therein as described above.

This corrective action is taken through the control system illustrated in FIGURE II mainly comprising a gating device indicated generally at 36, a switching device indicated generally at 37 and a voltage divider arrangement comprising a resistor 38, in series arrangement to ground through the flow tube resistances 18, 19, 20 or combinations thereof and a control grid 39 as a part of a pentode vacuum tube 40 in the gating device 36. This overall control system of the gating device and the switch and the resistance 38 as part of the voltage divider is powered by an A.C. supply 41 through suitable rectifiers 42 and 43 to provide this control arrangement with a D.C. character.

Accordingly, the general overall measurement system mainly shown at the top of FIGURE II is an alternating current system and a high impedance input device in the usual fashion of a particular magnetic flow meter. The control system described above, on the other hand, is a D.C. arrangement which because of its high impedance does not affect the output level of the transmitter signal, and not being A.C., does not interfere with the measurement signal as received by the instrument. Thus, it may be operated in simple fashion in combination therewith.

As voltage is generated by flow through the flow tube 10, it is connected in series opposition to a balancing voltage produced by the differential transformer 22. The output of the differential transformer varies with the position of the copper ring 32 as driven by the transducer 27. When the flow rate changes, the generated voltage from the flow tube is changed and the sum of the opposing voltages becomes the net value proportional to measurement change. The net value is amplified then compared in phase with line voltage at the unbalance detector to determine whether flow has increased or decreased. The two output lines from the unbalance detector circuit provide D.C. voltages, opposite in polarity, equal at null balance, and unequal with increasing or decreasing flow. These voltages are impressed upon the grids of the power amplifier thus controlling the plate current of this circuit. The plate current energizes the solenoid coils 28 and 29 producing opposing magnetic forces which drive the pivoted mechanical member 30 to a new position. This movement operates the pen 34 and repositions the copper ring 32 on the differential transformer 22 to make the balancing voltage once again equal to the voltage generated from the flow tube 10 through the electrodes 16, 17.

In the operation of the previously described control system of this device when the flow tube resistances 18, 19, 20 are large because the fluid is absent or the impedance is high for other reasons as described, then the series arrangement of the resistance 38 with these resistances to the ground 21 is altered in the voltage divider arrangement. Accordingly, the lead 44 intermediate of the resistance 38 and the flow tube resistances is used to apply voltage change to the control grid 39 of the pentode 40. This action in one particular arrangement operates to activate the pentode 40 so its output to the plate 45 energizes the coil 46 for contacts 47, 48, 49. By means of contacts 47 and 48 both of the solenoid coils 28 and 29 from the output of the power amplifier 26 are cut off and made inoperative in the usual measurement sense. They no longer have control effect on the selected one of these coils, for example, the down-movement coil 29. Instead, the coil 29 is provided, through the switch 37, with a path to system ground through contact 49 and resistor 50 in such manner that coil 29 is energized to actually move recorder pen arm 34 downscale to zero regardless of the action and operation of the measuring system until corrective actions are taken and the contacts 47, 48 and 49 are reestablished in their normal measurement situation.

The mode of the gating unit and switching device operation can be made the inverse of that noted and illustrated by adjustment of the voltage polarity impressed on the voltage divider and the cathode bias resistor shown in FIGURE II.

This previously described control system operates on a D.C. signal basis and therefore is insensitive to cable lengths over wide range, introduces little or no out of phase or noise signal or zero shift and will not require adjustment for noise level changes, cable length changes and the like.

This device may be considered as a conductivity sensing device to determine film build-up conditions such as may occur within the flow tube from raw sludge, for example, and purging may be initiated as the action taken by the previously described control system instead of or in combination with the zeroing action.

It will be seen in the normal operation of one specific system wherein the resistances within the flow tube are at the usual operating level, then the pentode tube 40 is not operating because of the low voltage on the control grid 39 due to the connection to ground from the resistance 38 and through the flow tube resistances 18, 19 and 20 in the voltage divider system. However, when these irregularities occur within the flow tube, then a much higher voltage is applied to the control grid 39 and the pentode tube 40 is actuated to operate the switch 37 and provide the control action as indicated hereinbefore.

This invention, therefore, provides a new and useful flow meter system wherein control means is provided for action in response to inordinately high impedances being introduced into the flow tube as, for example, by the absence of the usual conductive fluid being measured therein.

As many embodiments may be made in the above, and as changes may be made in the embodiments set forth above without departing from the scope of the invention, it is to be understood that all matter hereinbefore set forth or shown in the accompanying drawings is to be interpreted as illustrative only and not in a limited sense.

I claim:

An improved magnetic flow meter circuit system comprising, in combination:

a magnetic flow meter unit for measuring electrically conductive fluid, a pipe in said flow meter through which fluid to be measured is passed, a pair of measuring electrodes and a grounded electrode in said pipe, and a power source of alternating current operatively connected to said flow meter unit, a high input impedance alternating current unbalance measurement circuit, including said electrodes and the electrical resistance between said electrodes, said resistance normally provided by the fluid being measured, a direct current control circuit, including at least one of said measuring electrodes and said ground electrode, and the said electrical resistance therebetween, and a mechanical system for rebalancing said measurement circuit, normally operatively connected as a feedback for said measurement circuit from the output of said measurement circuit, said alternating current measurement circuit further comprising a differential transformer, a power connection to said transformer from said alternating current power source, and a signal connection to said transformer from said measurement electrodes, an unbalance voltage amplifier, a signal connection input from the output of said transformer to said voltage amplifier and a connection from said ground electrode to said voltage amplifier, an unbalance detector circuit, an input to said detector circuit from the output of said voltage amplifier, a power amplifier, an input to said power amplifier from the output of said detector circuit, an electromechanical transducer for operating said mechanical rebalancing system, an electrical input to said transducer from the output of said power amplifier, and an electrical switch in said output of said power amplifier between said power amplifier and said transducer, said direct current control circuit further comprising a gating device in the form of a pentode vacuum tube, a voltage divider circuit wherein one voltage divider circuit branch leads to ground through at least one of said flow meter measurement electrodes and said ground electrode, normally through fluid being measured in said flow meter, and another voltage divider circuit branch leads to a control grid in said pentode, and means electrically connecting the output of said pentode to said electrical switch in the output of said power amplifier, whereby said switch is operated when fluid is absent from said flow meter pipe, due to voltage change on said pentode grid in consequence of the voltage change between said electrodes in said flow meter pipe when fluid is absent from said pipe, and a separate power source which is operatively connected through said switch to said electromechanical transducer in the place of said output of said power amplifier to override said measurement circuit when said switch is operated through said control system, said mechanical rebalancing system further comprising the mechanical portion of said electromechanical transducer, a movable ring in said differential transformer for varying the output of said transformer according to the position of said ring, and an operative connection between said ring and said mechanical portion of said electromechanical transducer.

References Cited by the Examiner

UNITED STATES PATENTS

| | | | |
|---|---|---|---|
| 2,551,479 | 5/1951 | Wallace | 340—239 |
| 2,729,103 | 1/1956 | Raynsford et al. | 73—194 |
| 2,798,215 | 7/1957 | Domingo et al. | 340—239 |
| 2,808,723 | 10/1957 | Butenbach | 324—34 X |
| 2,828,479 | 3/1958 | Jackson | 340—239 |
| 2,887,878 | 5/1959 | Kamp et al. | 73—194 |
| 3,002,282 | 10/1961 | Mittelmann | 324—34 X |
| 3,006,188 | 10/1961 | Handel et al. | 73—194 |
| 3,078,712 | 2/1963 | Koblenz et al. | 73—194 |
| 3,094,000 | 6/1963 | Kass | 73—194 |

OTHER REFERENCES

Wetmore, G. E.: Electronic Equipment, August 1955, pp. 24–26, "Measure Flow Magnetically."

WALTER L. CARLSON, *Primary Examiner.*

FREDERICK M. STRADLER, *Examiner.*

C. F. ROBERTS, *Assistant Examiner.*